April 11, 1933.  W. H. WOOLUMS ET AL  1,903,748

ROAD MARKER

Filed April 16, 1931

Inventors
William H. Woolums and
Clyde B. Ambrose

Patented Apr. 11, 1933

1,903,748

UNITED STATES PATENT OFFICE

WILLIAM H. WOOLUMS AND CLYDE E. AMBROSE, OF WASHINGTON, DISTRICT OF COLUMBIA; SAID AMBROSE ASSIGNOR TO BULLS EYE ROAD MARKER COMPANY, OF WASHINGTON, DISTRICT OF COLUMBIA, A CORPORATION OF DELAWARE

ROAD MARKER

Application filed April 16, 1931. Serial No. 530,630.

This invention relates to road markers and has particular reference to those markers used to designate traffic lanes, and more particularly relates to refracting and reflecting markers constructed of transparent or translucent materials, such as glass, bakelite, pyroxylin, etc.

Heretofore in the marking of street intersections, road centers, and other traffic lanes, markers have been used to excellent advantage, however, such devices have been operating under a tremendous handicap, to wit, low visibility, and such devices are practically useless at night. I am aware that glass markers have been tried with no improved result due to the lack of proper light collecting and reflecting means. Although, in some cases reflectors have been incorporated in the base portions thereof, such devices have been unimproved because the required strength obviated the possibility of a hollow glass marker and a solid marker could not be made to reflect the light except in one direction.

It is an object of this invention to provide a marker of transparent material to overcome the aforementioned difficulties.

A further object of this invention is to provide a transparent marker having a positive means for locking it in place on a road bed.

Another object of this invention is to provide a transparent marker having a reflecting means positioned in alinement with the light rays emanating from the headlights of a vehicle and arranged to reflect a portion of such light back toward the vehicle.

A still further object of this invention is to provide a transparent marker having such a configuration as to concentrate any light received upon a reflector arranged to return the light toward the vicinity from which it is received.

Still a further object of the invention resides in the simplicity and economy of the marker and its long useful life.

Another object of the invention resides in the utilization of a raised or upwardly extending reflector without detracting in any way from the strength of the marker.

Other objects and advantages will be both obvious and apparent from the following detailed description and the annexed drawing, wherein.

Figure 1:
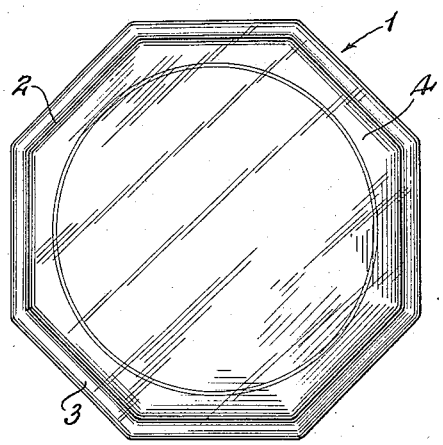
Figure 1 is a plan view of a marker constructed in accordance with the invention.

Having more particular reference to the drawing wherein like characters of reference denote corresponding parts throughout the several views, the numeral 1 designates generally a road marker constructed in accordance with the invention and having in this instance, a substantially octagonal disk-like body portion 2, a retaining or securing ridge 3 is formed about the periphery of the basal portion of the body 2, and serves the dual purpose of providing a means for permanently securing the marker in a road bed and forming an extended and substantial footing or base to transfer loads from the marker to the road bed.

As will be readily seen from the drawing, the body 2 of the marker 1 has a convex upper face 4 to serve the purpose of concentrating the light rays toward the central portion of the body 2, at which point is arranged a reflecting member 5 in the form of an inverted cone whereby the concentrated light rays are reflected in a diffused beam back toward the direction from whence they come. At this point, it should be noted that the reflecting means 5 need not be in the form of an inverted cone, but may be spherical or polygonal within reasonable limits and effect a result nearly as satisfactory for the purpose. The point of importance, however, is the proximity of the reflector to the upper face 4 and its angularity to this face, as the deflected light rays are in this plane and greatly concentrated toward the center of the body portion 2.

The cone reflector 5 is continued downward and its base portion 6 diverges into a flat or nearly flat reflecting surface 7 forming the lower face of the body 2. This portion 7 provides a means of reflecting and diffusing any light rays received from points above the marker in a manner to illuminate the same during the day or from overhead lights, etc.

Figure 3:
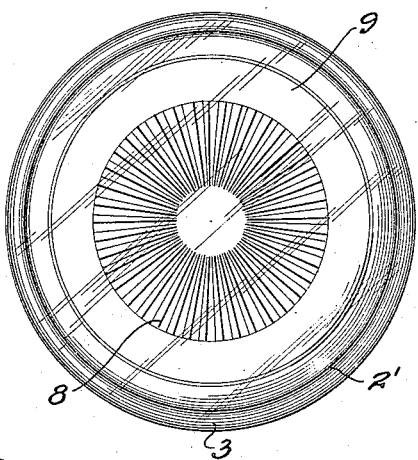
Figure 3 is a plan view of a slightly modified marker.

In carrying out the invention it is sometimes desirable to form the marker 1 of a round body 2' as shown in the modification, Figure 3 of the drawing, and in this instance the flat portion of the reflector is provided with serrations 8, to more completely diffuse the light reflected thereby. It may also be noted that in this form the face 9 of the marker is in the form of a very flat inverted cone in order to give the marker body 2' greater depth at the center for the purpose of providing increased strength.

Figure 5:
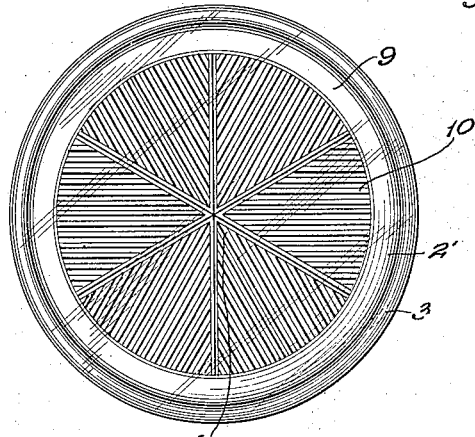
Figure 5 is a plan view of a further modification of the invention.
Figure 2:
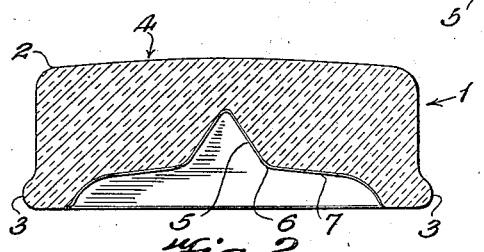
Figure 2 is a vertical sectional view through the marker showing the reflecting member.
Figure 4:
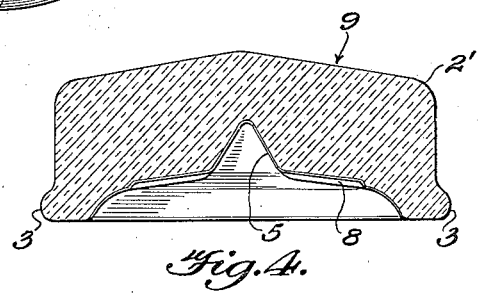
Figure 4 is a vertical section through the same.

Another form of the invention is shown in Figure 5, wherein the serrations 10 are arranged to extend over the entire reflector. Such a construction is useful where a slightly different effect is desired in order to differentiate from the usual purpose of the marker.

The markers may be colored to serve as warnings or for other obvious purposes, thus one color may be used for cross walks, another for center marking and a third for "no parking" or parking zones, etc. As previously stated, these markers may be made of transparent or translucent materials. When made of colored translucent material, the use of reflecting surfaces in the recesses formed in the bottom face of the marker becomes unnecessary. However, the central conical recess terminating in the larger saucer-shaped recess remains in said marker and forms additional means, together with the peripheral retaining ridge, for anchoring and sealing said marker in the roadbed.

Manifestly, the construction herein shown is capable of considerable modification and such modifications as come within the scope of our claims, we consider within the spirit of our invention.

We claim:

1. In a road marker, a translucent body portion, a peripheral retaining ridge coincident with the base portion thereof and forming an extended footing for added support, the upper edge portion of said ridge being rounded to prevent breakage.

2. In a road marker, a disk-like body of translucent material, a peripherally arranged retaining ridge formed with the base thereof, a reflecting cone disposed centrally of said body and adjacent the upper face thereof to intercept the light rays concentrated at this point and a serrated reflecting disk arranged around said cone and adjacent the lower face of said body to diffuse other light rays.

3. In a road marker, a disk-like body having a convex upper face, a reflecting cone disposed centrally of said body and having a diverging base, a flat reflecting annulus formed by said base whereby light rays received by said body from an oblique direction will be reflected by said cone and light rays received from direct angles will be reflected by said annulus and cone.

4. In a road marker, a translucent body portion, a peripheral retaining ridge coincident with the base portion thereof and forming an extension of the same, a substantially flat reflecting portion arranged in the base of said body and a central raised cone reflector of less area than said flat reflecting portion.

5. In a road marker, a body portion of translucent material, a peripheral retaining ridge coincident with and forming a part of the base portion of said body, a flat annular reflector arranged within said base portion and raised above the same, and a conical reflector centrally arranged in said annular reflector the walls of both of said reflectors joining in an arc to provide an unbroken reflecting surface.

6. In a road marker, a relatively thick disk-like body of translucent material, a peripheral outstanding bead forming a footing on the base portion of said body to support and aid in the anchoring of the latter, the remainder of said body being of a diameter less than the diameter of the base with said bead thereon.

7. In a road marker, a relatively thick disk-like body of translucent material having the bottom face thereof double-cut to form a central and a surrounding recess, a peripheral outstanding bead forming a footing on the base portion of said body to support the latter and aid with said recesses in anchoring and sealing said body in a roadbed.

8. In a road marker, a relatively thick disk-like body of translucent material having the bottom face thereof recessed to provide an axial cone-shaped chamber terminating in an outer saucer-shaped recess of a diameter less than the diameter of said body, the supporting base portion of said body beyond the periphery of said recess being provided with a peripheral outstanding bead forming a retaining ridge to assist with said chamber and recess in anchoring and sealing said body in a roadbed.

In witness whereof we have hereunto set our hands.

WILLIAM H. WOOLUMS.
CLYDE B. AMBROSE.